US011332257B2

(12) United States Patent
Drancea et al.

(10) Patent No.: US 11,332,257 B2
(45) Date of Patent: May 17, 2022

(54) AIRCRAFT FUEL SYSTEM AND ASSOCIATED METHOD

(71) Applicant: BOMBARDIER INC., Dorval (CA)

(72) Inventors: Andrei Drancea, Toronto (CA); George Viscotchi, Dollard-des-Ormeaux (CA)

(73) Assignee: BOMBARDIER INC., Dorval (CA)

( * ) Notice: Subject to any disclaimer, the term of this patent is extended or adjusted under 35 U.S.C. 154(b) by 112 days.

(21) Appl. No.: 16/595,689

(22) Filed: Oct. 8, 2019

(65) Prior Publication Data

US 2020/0108943 A1    Apr. 9, 2020

Related U.S. Application Data

(60) Provisional application No. 62/743,106, filed on Oct. 9, 2018.

(51) Int. Cl.
*B64D 37/28* (2006.01)
*B64D 37/04* (2006.01)
*B64D 37/08* (2006.01)

(52) U.S. Cl.
CPC ............ *B64D 37/28* (2013.01); *B64D 37/04* (2013.01); *B64D 37/08* (2013.01)

(58) Field of Classification Search
CPC ........ B64D 37/28; B64D 37/04; B64D 37/32; B64D 37/14
See application file for complete search history.

(56) References Cited

U.S. PATENT DOCUMENTS 2,860,651 A * 11/1958 Davies ................... G05D 9/00
                                                            137/98
3,279,522 A * 10/1966 Norris ..................... F02C 7/236
                                                            137/256
8,480,133 B2    7/2013 Zhang et al.
8,881,764 B2 * 11/2014 Smith ..................... B64D 37/14
                                                            137/565.01
9,764,851 B2 *  9/2017 Komoda ................... B64C 3/34
2010/0122749 A1 *  5/2010 Bouleti ..................... F16L 25/01
                                                            138/177
2011/0209789 A1    9/2011 Murabayashi et al.
2015/0151845 A1    6/2015 Jones

FOREIGN PATENT DOCUMENTS

EP          2877400          1/2014
WO      2014018250 A1      1/2014

OTHER PUBLICATIONS

European Patent Office, Communication dated Feb. 13, 2020 re: application No. 19201349.8.

* cited by examiner

*Primary Examiner* — Joshua J Michener
*Assistant Examiner* — Colin Zohoori
(74) *Attorney, Agent, or Firm* — Norton Rose Fulbright Canada LLP

(57) ABSTRACT

Fuel systems, apparatus and associated methods for preventing or hindering unwanted fuel transfer between fuel tanks of aircraft are described. An exemplary apparatus comprises a conduit portion disposed inside a fuel tank for receiving fuel in the first fuel tank. The conduit portion includes an orifice through a wall of the conduit. The orifice permits venting an interior of the conduit portion to an interior of the fuel tank to prevent unwanted fuel transfer due to siphoning. A deflector is disposed and configured to deflect a stream of fuel discharged from the orifice during fuel transfer.

25 Claims, 7 Drawing Sheets

AIRCRAFT FUEL SYSTEM AND ASSOCIATED METHOD

CROSS REFERENCE TO RELATED APPLICATION AND CLAIM OF PRIORITY

This application relies for priority on U.S. Provisional Patent Application Ser. No. 62/743,106 filed on Oct. 9, 2018, the entire content of which is incorporated herein by reference.

TECHNICAL FIELD

The disclosure relates generally to aircraft, and more particularly to fuel systems of aircraft.

BACKGROUND

Some aircraft have multiple fuel tanks where fuel can be transferred from one fuel tank to another. For example, in cases where fuel is supplied to one or more aircraft engines only from a first fuel tank and not from a second fuel tank, fuel can be transferred from the second fuel tank to the first fuel tank to permit the fuel in the second fuel tank to be supplied to the engine(s) via the first fuel tank. In some situations, fuel can be transferred from one tank to another fuel tank onboard an aircraft to achieve a more desirable weight distribution for flight of the aircraft. Fuel transfer systems of aircraft should be configured to hinder the occurrence of unwanted fuel transfer between fuel tanks.

SUMMARY

In one aspect, the disclosure describes a fuel system of an aircraft. The fuel system comprises:
  a first fuel tank;
  a second fuel tank;
  a conduit permitting fuel transfer from the first fuel tank to the second fuel tank, the conduit including a first conduit portion disposed inside the first fuel tank and an inlet for receiving fuel in the first fuel tank, the first conduit portion including an orifice through a wall of the conduit, the orifice permitting venting of an interior of the conduit to an interior of the fuel tank; and
  a deflector disposed outside of the conduit and adjacent the orifice to deflect a stream of fuel discharged from the conduit via the orifice during fuel transfer.

The deflector may at least partially surround the conduit.
The deflector may have an annular shape.
The deflector may define a channel for directing the fuel discharged via the orifice toward an opening to the interior of the first fuel tank.
The opening to the interior of the first fuel tank may comprise a gap between the deflector and the wall of the conduit.
The deflector may be electrically bonded to the conduit.
The deflector may be secured to the conduit.
The deflector may be part of a bracket for mounting the conduit to another structure.

In some embodiments, the fuel system may comprise:
  a non-return valve disposed and configured to prevent fuel flow from the second fuel tank toward the first fuel tank via the conduit; and
  a pump configured to drive fuel from the first fuel tank toward the second fuel tank via the conduit, the pump being disposed upstream of the non-return valve along the conduit, wherein the orifice is disposed between the non-return valve and the pump along the conduit.

The pump may be an ejector pump disposed inside the first fuel tank.
The first fuel tank may be an aft auxiliary fuel tank of the aircraft.
The second fuel tank may be a wing fuel tank of the aircraft.

Embodiments can include combinations of the above features.

In another aspect, the disclosure describes an apparatus for hindering unwanted fuel transfer out of a fuel tank of an aircraft. The apparatus comprises:
  a conduit permitting fuel transfer out of the fuel tank, the conduit including a first conduit portion disposed inside the fuel tank and an inlet for receiving fuel in the first fuel tank, the first conduit portion including an orifice through a wall of the conduit, the orifice permitting venting of an interior of the conduit to an interior of the fuel tank; and
  a deflector disposed outside of the conduit and adjacent the orifice to deflect a stream of fuel discharged from the conduit via the orifice during fuel transfer.

The deflector may at least partially surround the conduit.
The deflector may define a channel for directing the fuel discharged via the orifice toward an opening to the interior of the first fuel tank.
The opening to the interior of the first fuel tank may comprise a gap between the deflector and the wall of the conduit.
The deflector may be electrically bonded to the conduit.
The deflector may be part of a bracket for mounting the conduit to another structure.

Embodiments can include combinations of the above features.

In a further aspect, the disclosure describes an aircraft comprising the fuel system as described herein.

In a further aspect, the disclosure describes an aircraft comprising the apparatus as described herein.

In a further aspect, the disclosure describes a method of transferring fuel out of a fuel tank onboard an aircraft. The method comprises:
  transferring fuel out of the fuel tank via a conduit;
  during the transferring of the fuel, discharging a stream of fuel from the conduit into an interior of the fuel tank; and
  deflecting the stream of fuel being discharged from the conduit.

Transferring fuel out of the fuel tank via the conduit may comprise pumping the fuel, and discharging a stream of fuel from the conduit may comprise discharging a stream of fuel via an orifice formed through a wall of the conduit. The method may comprise: ceasing to pump the fuel; and after ceasing to pump the fuel, venting an interior of the conduit to the interior of the fuel tank via the orifice.

The method may comprise, after deflecting the stream of fuel, channeling the deflected fuel toward an opening to the interior of the fuel tank.

The opening to the interior of the fuel tank may comprise a gap between the wall of the conduit and a deflector deflecting the stream of fuel.

The fuel tank may be an aft auxiliary fuel tank of the aircraft and the method may comprise transferring the fuel to a wing fuel tank of the aircraft.

The stream of fuel may be discharged from the conduit at a location along the conduit that is between a non-return valve and a pump.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following describes fuel systems, apparatus and associated methods for transferring fuel between fuel tanks of aircraft while preventing or hindering unwanted fuel transfer between such fuel tanks. It can be desirable to utilize ejector pumps in aircraft fuel transfer systems. Since ejector pumps are disposed inside fuel tanks, they are preferred over electrical pumps because they do not require electrical power/connections. An ejector pump can be a pumping device having no moving parts and that uses a fluid or gas as a motive force. The ejector pump can be activated or deactivated by controlling a flow of pressurized fluid that drives the ejector pump. In some installations and scenarios, the flow of fuel through the ejector pump could potentially continue due to siphoning despite the ejector pump having been deactivated. This can result in uncommanded and unwanted fuel transfer from one tank to another tank onboard the aircraft. In various embodiments, the fuel systems, apparatus and methods disclosed herein can prevent or hinder such unwanted fuel transfer between fuel tanks through an ejector pump caused by siphoning.

Aspects of various embodiments are described through reference to the drawings.

Figure 1:
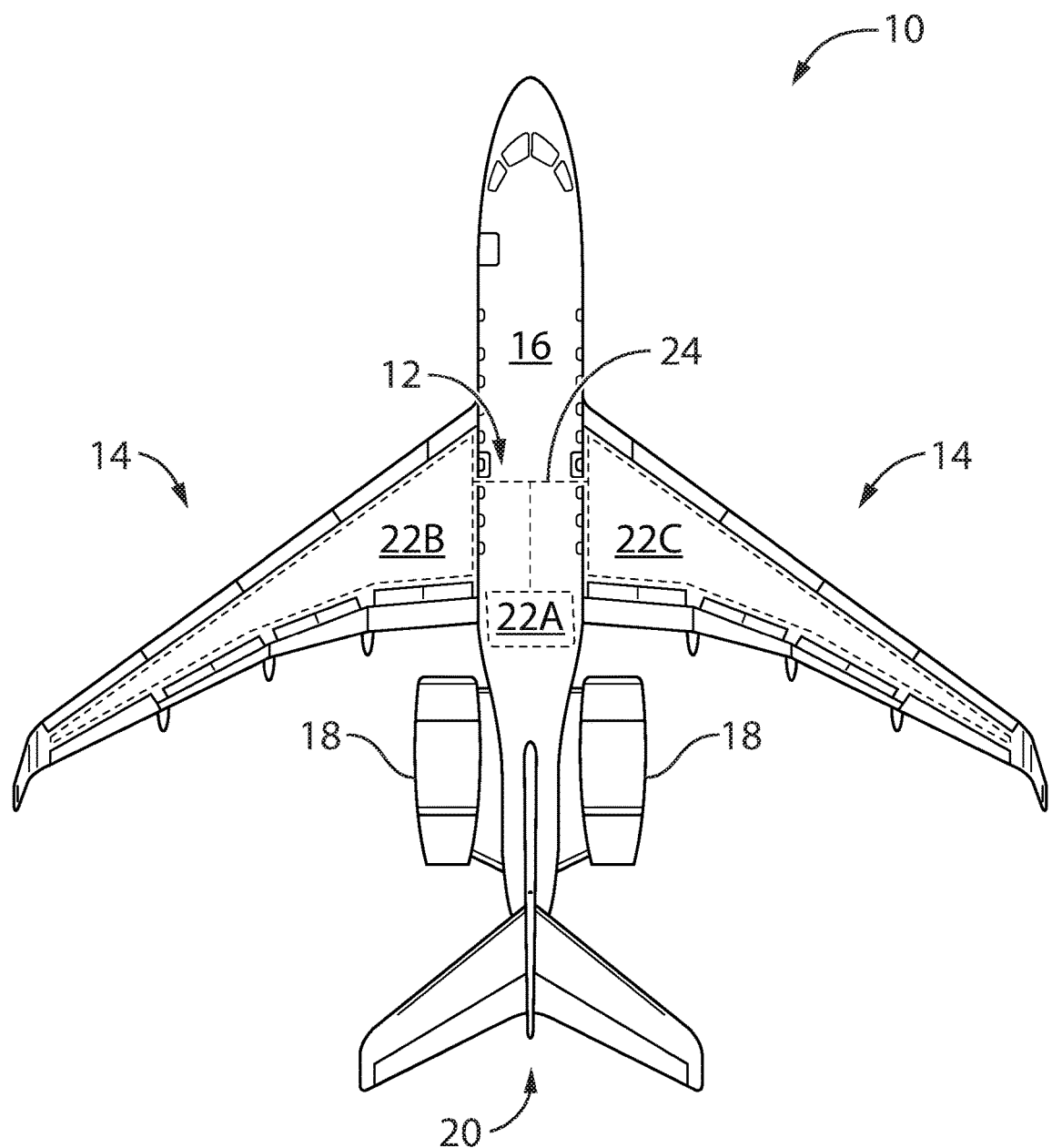
FIG. 1 is a top plan view of an exemplary aircraft comprising a fuel system as described herein.

FIG. 1 is a top plan view of an exemplary aircraft 10, which comprises fuel system 12 as disclosed herein. Aircraft 10 can be any type of aircraft such as corporate (e.g., business jet), private, commercial and passenger aircraft suitable for civil aviation. For example, aircraft 10 can be a narrow-body, twin-engine jet airliner or can be an ultra-long range business jet. Aircraft 10 can be a fixed-wing aircraft. Aircraft 10 can comprise wings 14, fuselage 16, one or more engines 18 and empennage 20. Aircraft 10 can comprise a plurality of fuel tanks 22A-22C. In some embodiments, first fuel tank 22A can be disposed in a generally aft region inside fuselage 16 and can be referred to as an "aft auxiliary fuel tank". In some embodiments, second fuel tank(s) 22B, 22C can be disposed inside respective wings 14 and can be referred to as "wing fuel tanks". It is understood that aspects of this description are applicable to various fuel tanks disposed in different locations within aircraft 10.

Fuel stored in fuel tanks 22A-22C can be used to power engines 18 and/or an auxiliary power unit (APU) onboard aircraft 10 for example. In some situations, it can be desirable to move fuel between fuel tanks 22A-22C. For example, dues to the different positions of fuel tanks 22A-22C on aircraft 10, it can be desirable to move fuel: (1) from first fuel tank 22A to second fuel tank(s) 22B, 22C; or (2) from second fuel tank(s) 22B, 22C to first fuel tank 22A in order to adjust a weight distribution of aircraft 10 before or during flight of aircraft 10. Fuel transfer between two or more fuel tanks 22A-22C can be achieved via one or more conduits 24 (e.g., tubes, pipes).

Figure 2:
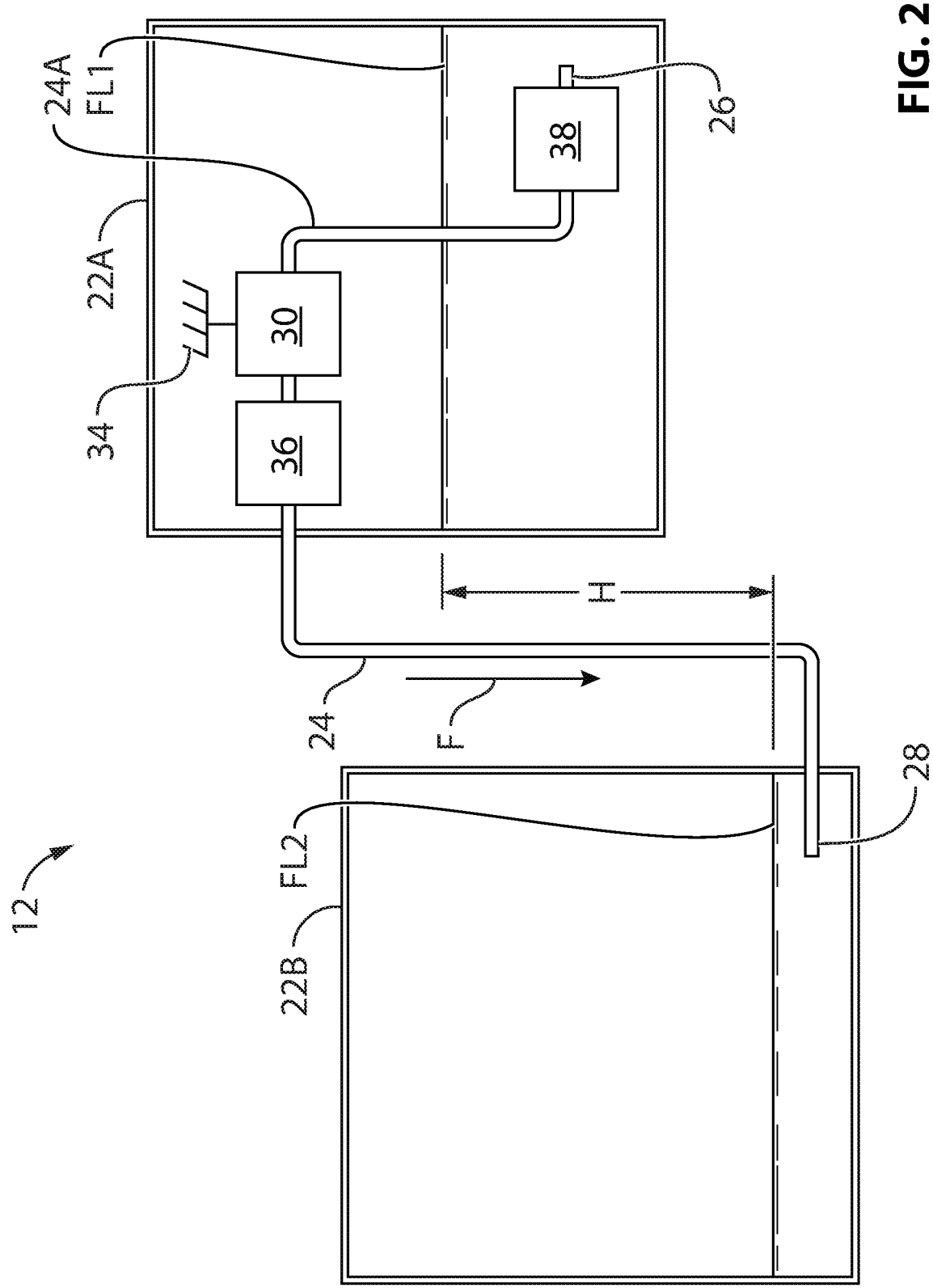
FIG. 2 is a schematic diagram of an exemplary fuel system of the aircraft of FIG. 1.

FIG. 2 is a schematic diagram of an exemplary fuel system 12 of aircraft 10. It is understood that fuel system 12 can comprise other components such as conduits, valves, pumps, etc. which are not illustrated herein. Fuel system 12 can be configured to permit fuel transfer from first fuel tank 22A to second fuel tank 22B via conduit 24 (e.g., see arrow F). In some embodiments, fuel system 12 can be configured to permit fuel transfer from second fuel tank 22B to first fuel tank 22A via conduit 24 or another conduit. Conduit 24 can comprise inlet 26 for receiving fuel from first fuel tank 22A and outlet 28 for delivering fuel to second fuel tank 22B. Conduit 24 can comprise first conduit portion 24A that is disposed inside of first fuel tank 22A. Inlet 26 of conduit 24 can be disposed inside of first fuel tank 22A for receiving fuel in first fuel tank 22A and can be part of first conduit portion 24A. System 12 can comprise apparatus 30 that can serve to prevent or hinder unwanted fuel transfer out of first fuel tank 22A due to siphoning for example. As explained below, apparatus 30 can comprise or be configures as a bracket for mounting conduit 24 to another supporting structure 34. In some embodiments, structure 34 can be a (e.g., upper, top) wall of first fuel tank 22A for example.

In some embodiments, system 12 can comprise non-return (e.g., check, one-way) valve 36 disposed and configured to prevent fuel flow from second fuel tank 22B toward first fuel tank 22A via conduit 24. Non-return valve 36 can be installed on first conduit portion 24A and may be disposed inside first fuel tank 22A for example. System 12 can comprise pump 38 disposed and configured to drive fuel from first fuel tank 22A toward second fuel tank 22B via conduit 24. Pump 38 can be controlled (e.g., activated and deactivated) via command from a pilot of aircraft 10 or via command from a suitable system of aircraft 10. Pump 38 can be installed on first conduit portion 24A. Pump 38 can be disposed inside first fuel tank 22A. Pump 38 can be disposed upstream of non-return valve 36 along first conduit portion 24A. In some embodiments, apparatus 30 can be disposed between non-return valve 36 and pump 38 along first conduit portion 24A. In other words, apparatus 30 can be disposed upstream of non-return valve 36 and downstream of pump 38 along first conduit portion 24A.

Pump 38 and inlet 26 can be located in a lower portion of first fuel tank 22A in order to permit transfer of most of the fuel contained inside first fuel tank 22A out of first fuel tank 22A. Apparatus 30 can be located in an upper portion of first fuel tank 22A. As explained below, apparatus 30 can be configured to provide venting of an interior of conduit 34 to the interior of first fuel tank 24 in a mode of operation and it can be desirable to have apparatus 30 disposed above fuel level FL1 in first fuel tank 22A during that mode of operation.

In some embodiments, pump 38 can be an ejector pump disposed inside first fuel tank 22A. Such ejector pump 38 can be activated by a supply of pressurized air delivered from a compressor section of engine 18 or APU to pump 38 for example and can be deactivated by stopping the supply of pressurized air to pump 38 for example. It is understood that other types (e.g., electrical) pumps can be used but an ejector pump can be preferred in embodiments where pump 38 is located inside first tank 22A.

In some installations/situations: first fuel tank 22A can be disposed at a higher elevation than second fuel tank 22B; fuel level FL1 inside first fuel tank 22A can be higher than fuel level FL2 inside second fuel tank 22B in which fuel from first fuel tank 22A is received during fuel transfer (e.g., see height difference H); and/or inlet 26 of conduit 24 can be disposed at a higher elevation than outlet 28 of conduit 24. Such installations/situations in combination with an ejector as pump 38 could, without apparatus 30, be prone to continued unwanted fuel transfer out of first fuel tank 22A even after deactivation of pump 38 due to siphoning. As explained below, apparatus 30 can hinder such unwanted fuel transfer caused by siphoning.

Figure 3:
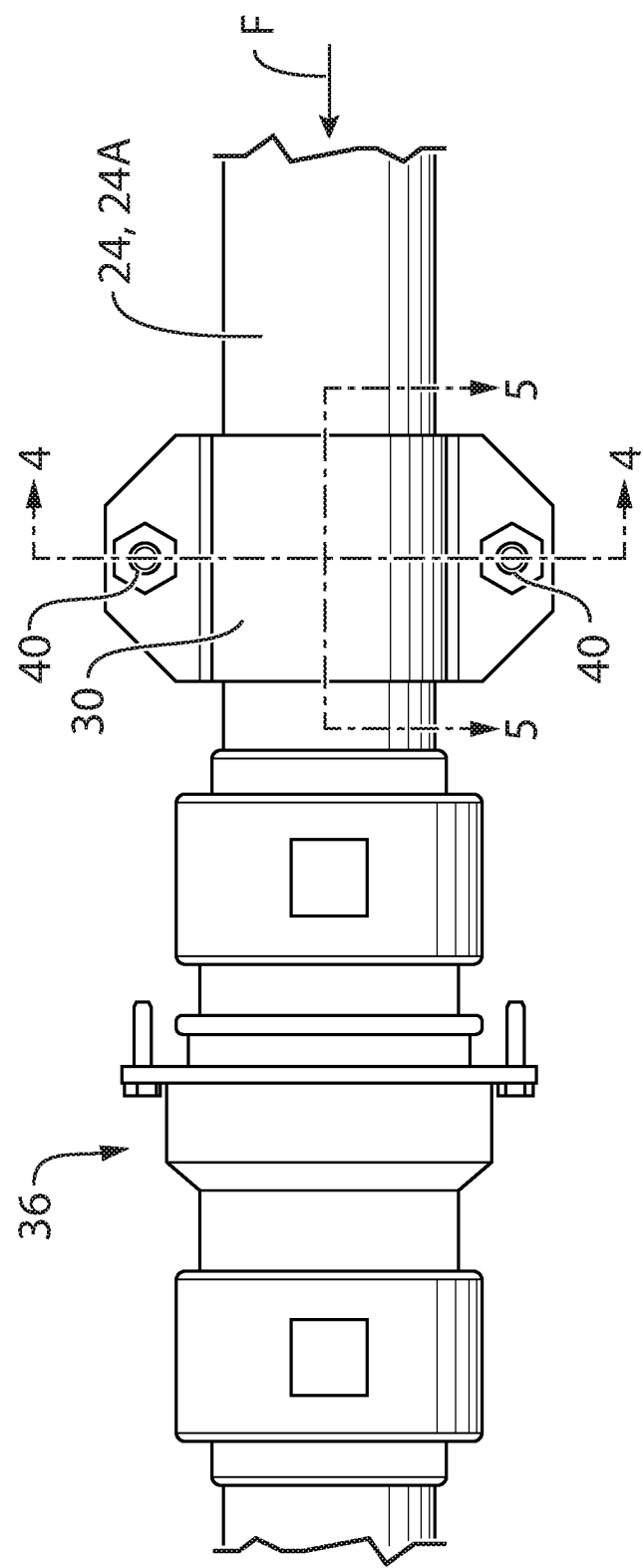
FIG. 3 is a perspective view of a portion of the fuel system of FIG. 2 comprising an exemplary apparatus for hindering unwanted fuel transfer out of a fuel tank of the aircraft of FIG. 1.

FIG. 3 is a perspective view of a portion of fuel system 12 located inside of first fuel tank 22A. The portion of fuel system 12 shown includes first conduit portion 24A, apparatus 30 and non-return valve 36. Apparatus 30 can be configured as a support bracket that is used to mount first conduit portion 24A to another structure 34 (see FIG. 4) via one or more fasteners 40.

Figure 4:
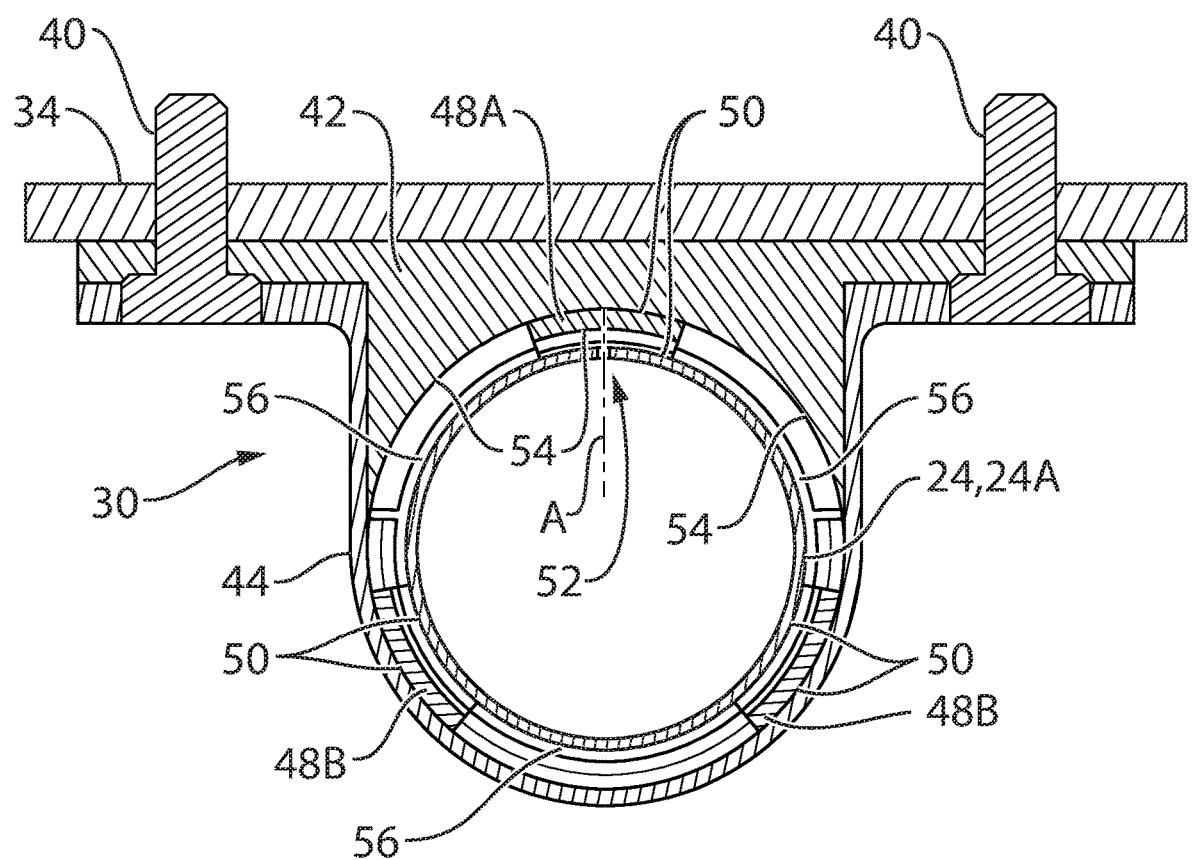
FIG. 4 is a cross-sectional view taken along line 4-4 of FIG. 3, of the apparatus for hindering unwanted fuel transfer of FIG. 3.

FIG. 4 is a cross-sectional view taken along line 4-4 of FIG. 3, of apparatus 30 for hindering the unwanted fuel transfer out of first fuel tank 22A due to siphoning. In some embodiments, apparatus 30 can comprise two main components, namely seat 42 and shroud 44 that cooperatively define a support bracket for mounting conduit 24 to support structure 34. Seat 42 can be shaped to receive part of conduit 24 therein and serve as an interface between conduit 24 and support structure 34. After assembling conduit 24 and seat 42 together and against support structure 34, shroud 44 can then be assembled to overlay the same part of conduit 24. Shroud 44 and seat 42 can then be secured (e.g., fastened) to support structure 34 via fasteners 40. In some embodiments, conduit 24 can interface with seat 42 and shroud 44 via optional mushroom caps 48A, 48B that may be secured to conduit 24 by welding for example. For example, mushroom cap 48A can be disposed between conduit 24 and seat 42 and one or more mushroom caps 48B can be disposed between conduit 24 and shroud 44. In some embodiments, conduit 24, mushroom caps 48A, 48B, seat 42 and shroud 44 can be made from one or more electrically-conductive (e.g., metallic) materials and consequently, apparatus 30 can provide electrical bonding between conduit 24 and support structure 34. In some embodiments, seat 42 and/or shroud 44 can be electrically coupled to conduit 24 either directly or indirectly via mushroom caps 48A, 48B. For example, mushroom caps 48A, 48B can be electrically coupled to conduit 24 and to seat 42 and shroud 44 respectively at electrical contact interfaces 50.

Apparatus 30 as referred herein can comprise the part of conduit 24 that is seated with seat 42 and shroud 44 since the corresponding part of conduit 24 can comprise one or more orifices 52 that cooperate with seat 42 and/or shroud 44 during fuel transfer out of first fuel tank 22A. Even though a single orifice is illustrated herein, it is understood that some embodiments of apparatus 30 can comprise a plurality of such orifices 52. Orifice 52 can be formed through a wall of conduit 24 in order to establish fluid communication between the interior of conduit 24 and the interior of first fuel tank 22A. Orifice 52 can be formed in an upper wall of conduit 24. Support structure 34 to which apparatus is secured can be an inner side of an upper wall of first fuel tank 22A. In reference to FIGS. 2 and 4, orifice 52 can be operatively disposed between non-return valve 36 and pump 38 along conduit 24.

Apparatus 30 can define one or more deflectors 54 that serve to deflect a stream of fuel that is discharged from orifice 52 during fuel transfer out of first fuel tank 22A. Deflector 54 can be defined by one or more radially-inner surfaces of seat 42, mushroom caps 48A, 48B and/or shroud 44. In other words, deflector 54 may be integral to the bracket that is defined by seat 42 and shroud 44. Deflector 54 can be disposed outside of conduit 24 and adjacent (e.g., in close proximity to) orifice 52 in order to interact with the stream of fuel that is discharged from orifice 52 during fuel transfer. In some embodiments, deflector 54 can have an annular shape. In some embodiments, deflector 54 can at least partially surround conduit 24. In some embodiments, deflector 54 can comprise a curved (e.g. arcuate) surface. In some embodiments, deflector 54 can be configured to channel the fuel discharged from orifice 52 toward one or more openings 56 to the interior of first fuel tank 22A. Openings 56 can be defined in apparatus 30 by one or more gaps between deflector 54 and the wall of conduit 24. For example: openings 56 can be defined by one or more gaps between seat 42 and conduit 24; openings 56 can be defined by one or more gaps between shroud 44 and conduit 24; and/or openings 56 can be defined by one or more gaps between mushroom caps 48A, 48B and conduit 24. In some embodiments, orifice 52 can have orifice axis A and deflector 54 can be disposed to intersect orifice axis A. Orifice axis A can be generally perpendicular to the wall of conduit 24 at the location of orifice 52. Orifice 52 can be a circular hole in some embodiments.

Figure 5A:
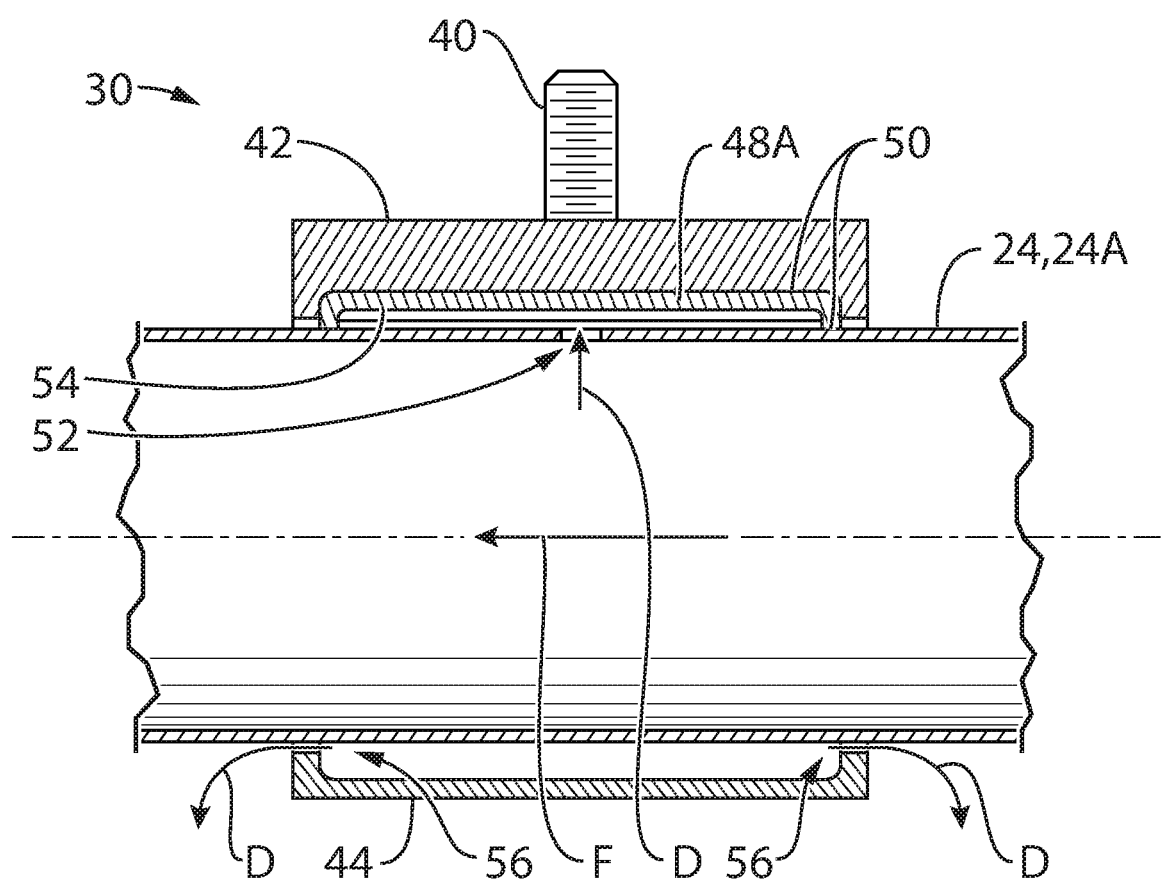
FIG. 5A is a cross-sectional view taken along line 5-5 of FIG. 3, of the apparatus for hindering unwanted fuel transfer of FIG. 3, in a first mode of operation where a stream of fuel is discharged from an orifice of a conduit of the apparatus.

FIG. 5A is a cross-sectional view taken along line 5-5 of FIG. 3, of apparatus 30 for hindering the unwanted fuel transfer out of first fuel tank 22A due to siphoning. FIG. 5A illustrates a first mode of operation of apparatus 30 where fuel is being transferred out of first fuel tank 22A (see arrow F) via conduit 24 due to the activation of pump 38 (shown in FIG. 2). Most of the fuel travelling through conduit 24 is transferred to second fuel tank 22B. However, the presence of orifice 52 through the wall of conduit 24 causes some fuel to be discharged from conduit 24 via orifice 52 and is returned to the interior of first fuel tank 22A (see arrows D). Due to the pressure differential between the interior of conduit 24 and the interior of first fuel tank 22B, the stream of fuel being discharged from orifice 52 can be in the form of a spray or jet exiting orifice 52. Accordingly, without deflector 54, the fuel being discharged from orifice 52 could be broken up into small droplets/particles and scatter freely through the space inside of first fuel tank 22A. In other words, the spraying of fuel out of orifice 52 could cause some misting and/or vaporisation of fuel, which could consequently and undesirably increase the flammability of the fuel inside first fuel tank 22A. Such spraying could also promote electrostatic charging of fuel droplets/particles which could also increase flamability.

Deflector 54 can serve as a catchment shield that captures (e.g., breaks) and redirects the spray of fuel being discharged from orifice 52 during fuel transfer. As shown in FIG. 5A, the fuel exiting orifice 52 hits deflector 54 and is then collected inside shroud 44 and caused to drip/flow back into the interior of first fuel tank 22A. Accordingly, the use of deflector 54 can significantly reduce the amount of misting and vaporisation of the fuel being discharged via orifice 52. In other words, deflector 54 can prevent the discharged fuel from being sprayed widely inside first fuel tank 22A. Therefore the presence of deflector 54 can reduce the flamability risk that could otherwise be accompanied by the presence of orifice 52 in conduit 24. The electrical bonding between deflector 54 and conduit 24 and/or between deflector 54 and support structure 34 can provide electrical grounding and thereby reduce the risk of electrostatic discharge.

Figure 5B:
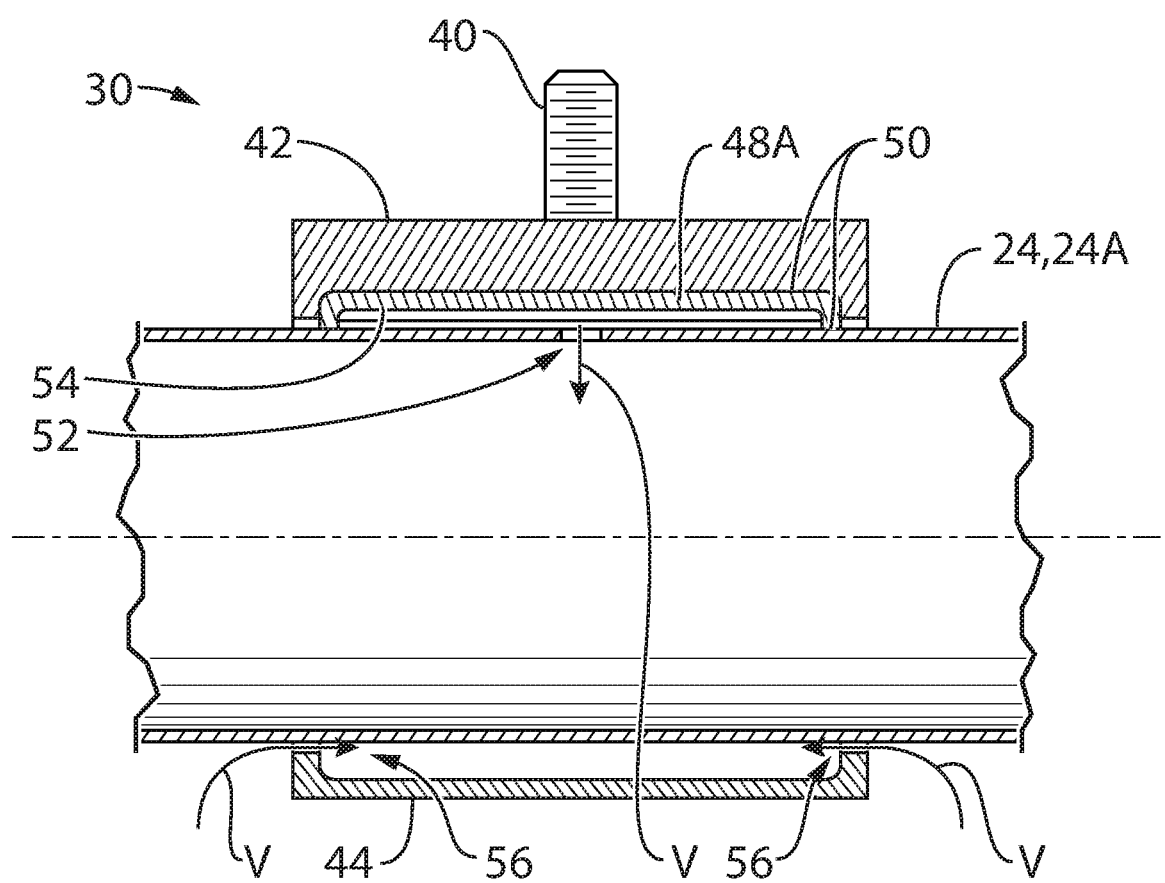
FIG. 5B is a cross-sectional view taken along line 5-5 of FIG. 3, of the apparatus for hindering unwanted fuel transfer of FIG. 3, in a second mode of operation where the conduit is vented to an interior of the fuel tank via the orifice.

FIG. 5B is a cross-sectional view taken along line 5-5 of FIG. 3, of apparatus 30 for hindering the unwanted fuel transfer out of first fuel tank 22A due to siphoning. FIG. 5B shows apparatus 30 in a second mode of operation where pump 38 (shown in FIG. 2) has been deactivated after a period of fuel transfer out of first fuel tank 22A. After the deactivation of pump 38, it can be desirable that fuel ceases to be transferred out of first fuel tank 22A. Accordingly, orifice 52 can provide venting of the interior of conduit 24 to the interior of first fuel tank 22A and thereby prevent or hinder the continued unwanted fuel transfer out of first fuel tank 22A due to siphoning. For example, shortly after deactivating pump 38, air or other gaseous substance(s) (e.g., vapour) from first fuel tank 22A can be drawn into conduit 24 via openings 56 and orifice 52 (see arrows V). Such venting can therefore prevent or hinder further liquid fuel from continuously being drawn into conduit 24 via inlet 26 (shown in FIG. 2) due to siphoning.

Figure 6:
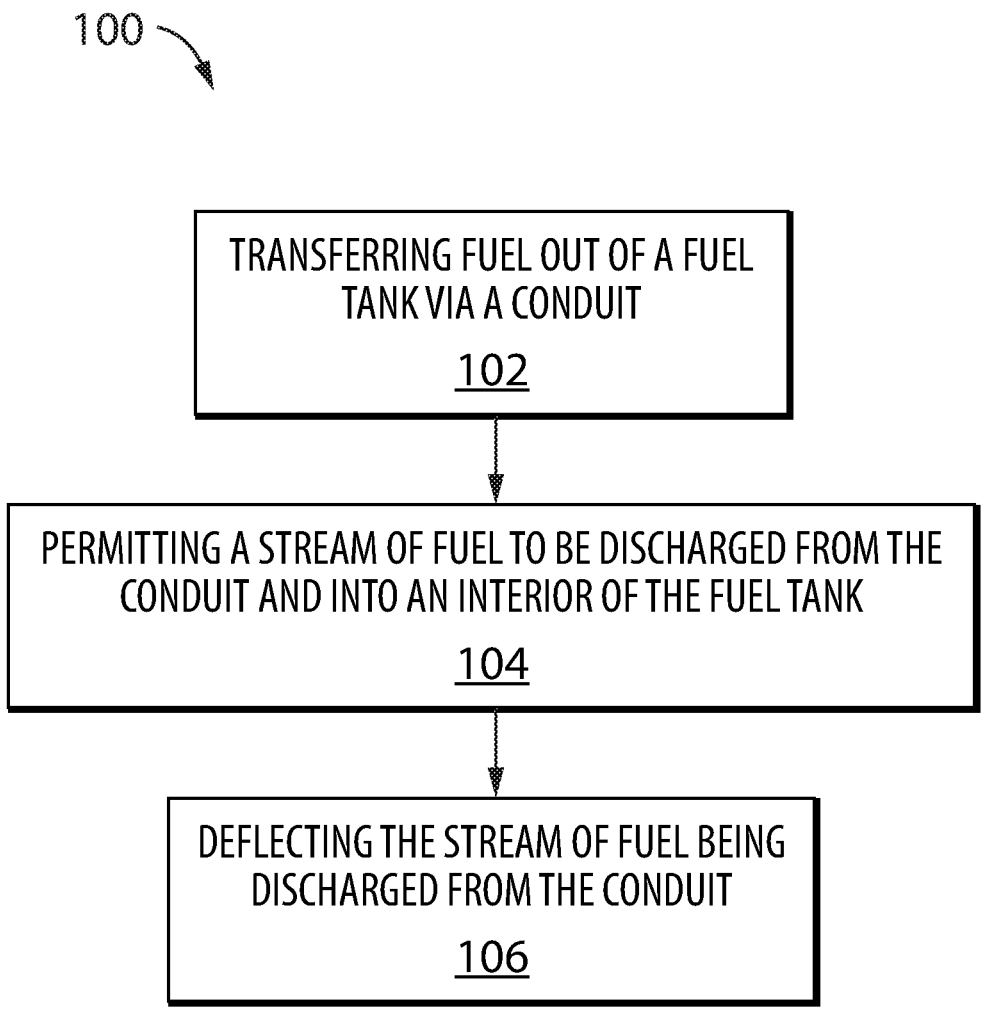
FIG. 6 is a flowchart illustrating a method for transferring fuel out of a fuel tank.

FIG. 6 is a flowchart illustrating a method 100 for transferring fuel out of a fuel tank (e.g., first fuel tank 22A) onboard aircraft 10. Method 100 can be performed using fuel system 12 as described herein or by other fuel systems. Method 100 can comprise: transferring fuel out of first fuel tank 22A via conduit 24 (see block 102); during the transferring of the fuel, permitting a stream of fuel to be discharged from conduit 24 and into an interior of first fuel tank 22A (see block 104); and deflecting the stream of fuel being discharged from conduit 24 (see block 106).

In some embodiments of method 100, transferring fuel out of first fuel tank 22A via conduit 24 can comprise pumping the fuel (e.g., using pump 38). Permitting the stream of fuel to be discharged from conduit 24 can comprises permitting the stream of fuel to be discharged via orifice 52 formed through a wall of conduit 24. Method 100 can also be used to prevent or hinder unwanted fuel transfer out of first fuel tank 22A due to siphoning. For example, method 100 can comprise ceasing to pump the fuel (e.g., by deactivating pump 38); and allowing venting of conduit 24 to the interior of first fuel tank 24 via orifice 52.

Method 100 can comprise channeling the deflected fuel toward opening 56 to the interior of first fuel tank 22A. As explained above, opening 56 can comprise a gap between the wall of conduit 24 and deflector 54 deflecting the stream of fuel.

First fuel tank 22A can be an aft auxiliary fuel tank of aircraft 10 and method 100 can comprise transferring the fuel to a wing fuel tank of aircraft 10.

The stream of fuel can be discharged from conduit 24 at a location along conduit 24 that is between non-return valve 36 and pump 38 (see FIG. 2).

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A fuel system of an aircraft, the fuel system comprising:
a first fuel tank;
a second fuel tank;
a conduit permitting fuel transfer from the first fuel tank to the second fuel tank, the conduit including a first conduit portion disposed inside the first fuel tank and an inlet for receiving fuel in the first fuel tank, the first conduit portion including a conduit wall defining a cross-sectional profile of the first conduit portion and extending from a first axial location to a second axial location spaced apart from the first axial location along the first conduit portion, an orifice formed through the conduit wall and disposed between the first axial location and the second axial location along the first conduit portion, the orifice permitting venting of an interior of the conduit to an interior of the fuel tank; and
a deflector disposed outside of the conduit and adjacent the orifice to deflect a stream of fuel discharged from the conduit via the orifice during fuel transfer,
wherein the deflector is integral with a bracket for mounting the conduit to another structure, the bracket comprising a seat shaped to receive the conduit, and the deflector being defined by an inner surface of the seat.

2. The fuel system as defined in claim 1, wherein the deflector at least partially surrounds the conduit.

3. The fuel system as defined in claim 1, wherein the deflector has an annular shape.

4. The fuel system as defined in claim 1, wherein the deflector defines a channel for directing the fuel discharged via the orifice toward an opening to the interior of the first fuel tank.

5. The fuel system as defined in claim 4, wherein the opening to the interior of the first fuel tank comprises a gap between the deflector and the conduit wall.

6. The fuel system as defined in claim 1, wherein the deflector is electrically bonded to the conduit.

7. The fuel system as defined in claim 1, wherein the deflector is secured to the conduit.

8. The fuel system as defined in claim 1, comprising:
a non-return valve disposed and configured to prevent fuel flow from the second fuel tank toward the first fuel tank via the conduit; and
a pump configured to drive fuel from the first fuel tank toward the second fuel tank via the conduit, the pump being disposed upstream of the non-return valve along the conduit, wherein
the orifice is disposed between the non-return valve and the pump along the conduit.

9. The fuel system as defined in claim 8, wherein the pump is an ejector pump disposed inside the first fuel tank.

10. The fuel system as defined in claim 1, wherein the first fuel tank is an aft auxiliary fuel tank of the aircraft.

11. The fuel system as defined in claim 1, wherein the second fuel tank is a wing fuel tank of the aircraft.

12. The fuel system as defined in claim 1, wherein the orifice is a hole formed in the conduit wall and having an orifice axis perpendicular to the conduit wall.

13. An aircraft comprising the fuel system as defined in claim 1.

14. An apparatus for hindering unwanted fuel transfer out of a fuel tank of an aircraft, the apparatus comprising:
- a conduit permitting fuel transfer out of the fuel tank, the conduit including a first conduit portion disposed inside the fuel tank and an inlet for receiving fuel in the fuel tank, the first conduit portion including a conduit wall defining a cross-sectional profile of the first conduit portion and extending from a first axial location to a second axial location spaced apart from the first axial location along the first conduit portion, an orifice formed through the conduit wall and disposed between the first axial location and the second axial location along the first conduit portion, the orifice permitting venting of an interior of the conduit to an interior of the fuel tank; and
- a deflector disposed outside of the conduit and adjacent the orifice to deflect a stream of fuel discharged from the conduit via the orifice during fuel transfer,
- wherein the deflector is integral with a bracket for mounting the conduit to another structure, the bracket comprising a seat shaped to receive the conduit, and the deflector being defined by an inner surface of the seat.

15. The apparatus as defined in claim 14, wherein the deflector at least partially surrounds the conduit.

16. The apparatus as defined in claim 14, wherein the deflector defines a channel for directing the fuel discharged via the orifice toward an opening to the interior of the fuel tank.

17. The apparatus as defined in claim 16, wherein the opening to the interior of the fuel tank comprises a gap between the deflector and the conduit wall.

18. The apparatus as defined in claim 14, wherein the deflector is electrically bonded to the conduit.

19. An aircraft comprising the apparatus as defined in claim 14.

20. A method of transferring fuel out of a fuel tank onboard an aircraft, the method comprising:
- transferring fuel out of the fuel tank via a conduit;
- during the transferring of the fuel, discharging a stream of fuel from the conduit into an interior of the fuel tank, the conduit having a conduit wall defining a cross-sectional profile of the conduit and extending from a first axial location to a second axial location spaced apart from the first axial location along the conduit, the stream of fuel being discharged from the conduit via an orifice formed through the conduit wall and disposed between the first axial location and the second axial location along the conduit; and
- deflecting the stream of fuel being discharged from the conduit, with a deflector disposed outside of the conduit and adjacent the orifice,
- wherein the deflector is integral with a bracket for mounting the conduit to another structure, the bracket comprising a seat shaped to receive the conduit, and the deflector being defined by an inner surface of the seat.

21. The method as defined in claim 20, wherein:
- transferring fuel out of the fuel tank via the conduit comprises pumping the fuel; and
- the method further comprises:
  - ceasing to pump the fuel; and
  - after ceasing to pump the fuel, venting an interior of the conduit to the interior of the fuel tank via the orifice.

22. The method as defined in claim 20, comprising, after deflecting the stream of fuel, channelling the deflected fuel toward an opening to the interior of the fuel tank.

23. The method as defined in claim 22, wherein the opening to the interior of the fuel tank comprises a gap between the conduit wall and the deflector deflecting the stream of fuel.

24. The method as defined in claim 20, wherein the fuel tank is an aft auxiliary fuel tank of the aircraft and the method comprises transferring the fuel to a wing fuel tank of the aircraft.

25. The method as defined in claim 20, wherein the stream of fuel is discharged from the conduit at a location along the conduit that is between a non-return valve and a pump.

* * * * *